United States Patent
Le Noane et al.

(10) Patent No.: US 6,718,101 B2
(45) Date of Patent: Apr. 6, 2004

(54) CONTINUOUSLY ACCESSIBLE OPTICAL CABLE

(75) Inventors: Georges Le Noane, St. Hilaire du Harcouet (FR); Dominique Brault, Mortain (FR); Christian Lagreve, Lonlay l'Abbaye (FR); Daniel Filliatre, Romagny (FR)

(73) Assignee: Acome (Societe Cooperative de Travailleurs) (FR)

( * ) Notice: Subject to any disclaimer, the term of this patent is extended or adjusted under 35 U.S.C. 154(b) by 0 days.

(21) Appl. No.: 10/069,493

(22) PCT Filed: Jun. 18, 2001

(86) PCT No.: PCT/FR01/01895
§ 371 (c)(1),
(2), (4) Date: Feb. 21, 2002

(87) PCT Pub. No.: WO01/98810
PCT Pub. Date: Dec. 27, 2001

(65) Prior Publication Data
US 2002/0122639 A1 Sep. 5, 2002

(30) Foreign Application Priority Data
Jun. 23, 2000 (FR) .............................. 00 08077

(51) Int. Cl.$^7$ .............................................. G02B 6/44
(52) U.S. Cl. ...................................... 385/109; 385/111
(58) Field of Search ................................ 385/109, 111

(56) References Cited

U.S. PATENT DOCUMENTS

| 5,163,116 | A | * | 11/1992 | Oestreich et al. | 385/111 |
| RE34,516 | E | * | 1/1994 | Houghton | 385/103 |
| 5,319,730 | A | * | 6/1994 | Rasanen et al. | 385/114 |
| 5,542,020 | A | * | 7/1996 | Horska | 385/112 |
| 5,740,295 | A | * | 4/1998 | Kinard et al. | 385/109 |
| 5,802,231 | A | | 9/1998 | Nagano et al. | 385/114 |
| 6,314,224 | B1 | * | 11/2001 | Stevens et al. | 385/113 |
| 6,501,889 | B1 | * | 12/2002 | Griffioen et al. | 385/114 |

FOREIGN PATENT DOCUMENTS

| EP | 0 459 688 | | 12/1991 |
| JP | 53-6046 | * | 1/1978 |
| JP | 60-134212 | * | 7/1985 |

OTHER PUBLICATIONS

DWPI abstract of DE 32 32 108.
DWPI Abstract of FR 99 13271.

* cited by examiner

Primary Examiner—Michael C. Zarroli
(74) Attorney, Agent, or Firm—Piper Rudnick LLP

(57) ABSTRACT

The invention concerns an optical cable with continuous accessibility, comprising a closed protective sheath surrounding a cavity having in cross section two substantially perpendicular axes intersecting at the center of the cavity, and at least two optical fibers optionally organized in at least two modules and arranged such that they occupy the greater part of the cavity in the direction of the long axis but that they allow a clearance in the cavity in the direction of the shorter axis of the cavity.

16 Claims, 3 Drawing Sheets

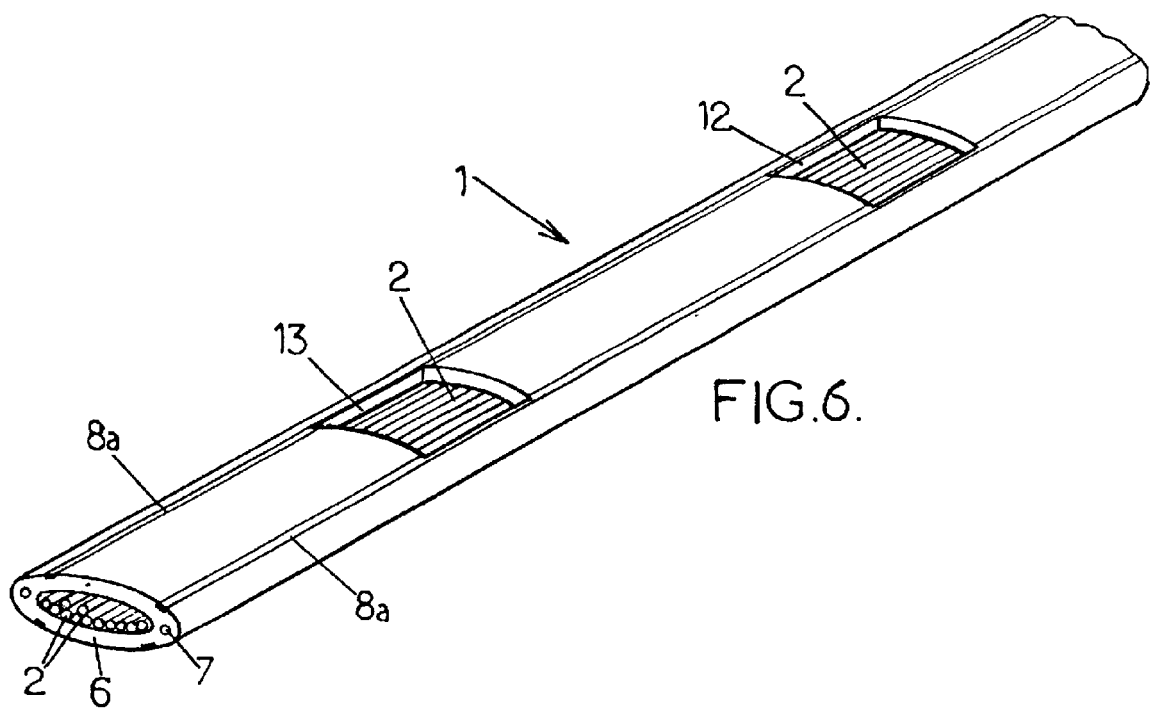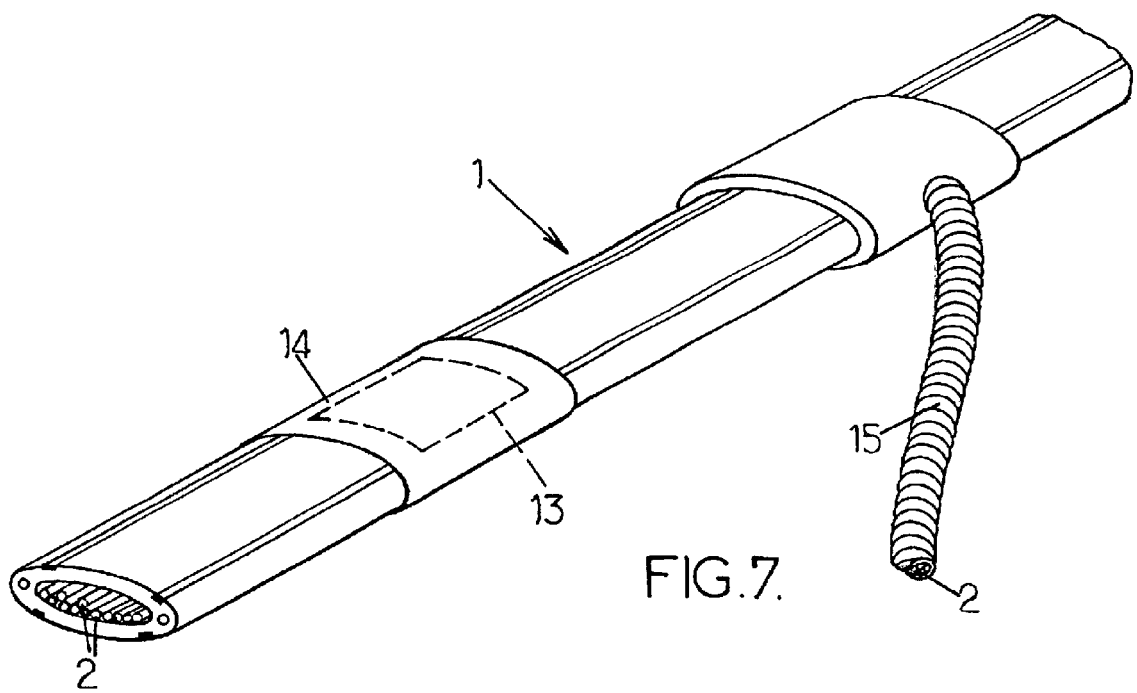

CONTINUOUSLY ACCESSIBLE OPTICAL CABLE

FIELD OF THE INVENTION

The present invention relates to an optical cable (also called an optical fiber cable) with continuous accessibility, particularly suitable for local subscriber loops and for internal cabling, providing very simple accessibility at any location and thus providing a very low cost branch-off without having to use a branch connection box.

BACKGROUND OF THE INVENTION

Many types of optical cables are known, making it possible to supply local networks or the cabling of buildings. In the majority of cases, these cables have a very dense structure. They comprise a relatively large number of fibers, and they are branched off using a branch connection box. It is by virtue of this branch connection box that after an often lengthy and tricky operation of removing the sheath from the cable over relatively great lengths, then of distributing the fibers, that it is possible to branch off one or more fibers. However, this operation is expensive and tricky. In addition, it is not without risk for the unbranched-off fibers which, in the majority of cases, are moreover high datarate carriers, that is to say ones having a large number of links transmitting voice, data or images. In addition, because of their architecture, these techniques are very often synonymous with distributed systems (for the cabling of buildings in particular), requiring the placement of numerous elementary cables, not to mention the presence of optoelectronic end devices. These distributed systems thus have the major drawback of leading to extremely high laying costs, which, for optical systems, generates a negative end result compared with the known copper systems.

To compensate for this major drawback, and to reduce the cost of installation, the majority of optical cable solutions developed to date tend toward cables which are as dense as possible, based on either stacks of ribbons, or on cylindrical modules of very small dimensions. Each ribbon or each cylindrical module may, for example, contain from 4 to 12 fibers, or even more. All of these ribbons or of these cylindrical modules are packed as closely as possible in a protective sheath possibly provided with reinforcements, according to the functional specifications of the cable. The sought-after aim is to obtain maximum density while retaining the appropriate mechanical and thermal properties for the optical cable.

The density thus obtained in the highest performance cables of the prior art allows them to be laid in microconduits, for example by blowing or pushing or pulling. However, these cables have the drawback of being quite difficult to access thereby making the tap-off operation, that is to say the branching-off of one module among n or of one fiber among n, expensive and tricky. They are therefore better suited to distributed techniques where the breakout made necessary takes place in a box designed to this end. In addition, the dense and cylindrical structure of the jacket of such cables requires an internal "cabling" of the optical elements (modules or optical fibers). This internal cabling is an assembly of optical elements with a given pitch either in a continuous helix (helical cabling), or in SZ (SZ cabling), so as to guarantee the integrity of the fibers when winding the cables.

Thus, in these known techniques, in order to operate correctly from the mechanical and thermal point of view and in order to comply with the radii of curvature, the relatively dense cable structures require "cabling" of this sort, which only increases the difficulty of access to the fibers and in particular makes it necessary for all the sheath to be removed over considerable lengths so as to allow the operator to handle the bundles with enough flexibility to access the sought-after module and, even more difficult, the sought-after fiber. In addition, cabling of this sort decreases the speed of cablemaking, and increases the costs. It can therefore be seen that, whatever their shape, oval, cylindrical, or other, none of these structures has been designed for continuous and easy accessibility of the fibers.

There is therefore a need for a cable designed to allow continuous and easy accessibility, therefore allowing easy branching, while remaining a very economical solution and installation system. Solving this problem is all the more significant since placing several cables in parallel, for example in order to supply several workstations inside a building, remains an expensive operation which places optical systems at a disadvantage with regard to copper.

A branchable optical cable is known, the principle of which is to place cable elements in a sheath or profile in the shape of a U open on one side, which may then be opened out right along the cable, at any location on the cable, and thus allow access to the cable elements. This cable was the subject matter of patent application FR 99 13271 filed by the applicant. However, a cable of this sort involves the special manufacture of cable elements and the use of a profile which may prove heavy and bulky and quite difficult to utilize, especially in terms of its storage on a cable drum, its laying and its accessibility.

OBJECTS AND DESCRIPTION OF THE INVENTION

The applicant has therefore developed an optical cable with continuous and easy accessibility, therefore making it possible to extract very easily from it, at any location, an optical element protecting one or more optical fibers, intended to supply a room or a region comprising several workstations. The cable developed by the applicant offers tensile strength and crush resistance properties which enable easy installation, for example in a conduit or in cable trays, in the latter case with an increased ability to follow localized curves and with a density which remains reasonable. Because of its structure, the cable which is subject of the invention also has excellent thermal behavior and can be wound with no problem on cable drums, without requiring cabling of the elementary optical elements inside the sheath.

The subject of the invention is therefore an optical cable with continuous accessibility, comprising a closed protective sheath surrounding a cavity having in cross section two substantially perpendicular axes intersecting at the center of the cavity, and at least two optical fibers arranged such that they occupy the greater part of the cavity along one axis but that they allow a sizeable clearance along the other axis of the cavity. The optical fibers can be organized into at least two optical elements (also called optical modules). The optical fibers, or optical modules, therefore form a sort of sheet, which is relatively loose or not depending on the number of fibers or modules. This arrangement of the cable according to the invention does not exclude some superposition of the fibers or of the modules within the sheet. Preferably, one of the axes is longer than the other axis. The optical elements are preferably positioned along this long axis, and therefore the clearance is left in the short axis. The clearance left in one of the axes is considerable with respect to the usual clearance of a dense optical cable structure, which is generally reduced to the strict minimum. This clearance therefore allows variations, called overlength, of the order of one percent or of a few percent (overlengths considered in per thousand in dense structures). Moreover, the sheet of fibers or of modules may move by translation in the cavity while remaining on the same axis (on the long axis in the case of an ovalized cavity).

The cavity has any shape, for example circular or oval or ovalized (that is to say between an oval and a rectangle), preferably ovalized. The sheath has any external shape, for example circular or oval or ovalized, preferably ovalized. In a particularly preferred embodiment, sheath and cavity are of ovalized shape, and their long axes are coincident.

In some embodiments, the sheath may comprise one or more mechanical reinforcing members, preferably positioned on either side of the cavity, again preferably along the long axis. These reinforcing members will preferably be of the nonmetallic glass-epoxy type, but may also be metallic. In an application of cable run type and over relatively short lengths, these reinforcing members may prove not to be indispensable making the production of the cable even more economical.

Thus, contrary to the teaching of the prior art, which encourages the perpetual search for an ever increasing density, the density of the cable which is the subject of the invention is deliberately less than the density that could be reached if the cavity was full. However, a cable of this type retains enough density to be used simply in installations of the conduit or cable-tray type, while offering some clearance in the cavity, facilitating the accessibility of the optical elements therefore of the optical fibers, and this by means of an optimized filling, a compromise between maximum filling and too low a density.

The preferably ovalized external shape of the cable according to the invention, together with the possible reinforcing members, confer on said cable a curving behavior which favors the long axis of the sheath preferably coincident with the long axis of the cavity, and therefore ensures winding along this long axis taking advantage of the considerable clearance in the short axis. This makes it possible to avoid "cabling" of the optical elements, which may therefore be placed lengthwise without twisting. This also offers some flexibility to the cable, in spite of its dimensions, which makes it possible to apply the cable easily to the curves, which are sometimes severe, of the cable trays. Moreover, the cable obtained has very good thermal and mechanical behavior while offering very simple accessibility by localized opening parallel to the long axis and visibility of the possibly colored optical cable elements laid lengthwise in the cavity. The curvature favored along the long axis of the external ovalized part and the reasonable density of the cable also make easy storage of significant lengths possible on a drum before laying and facilitate installation, and especially the curvatures required by laying in cable trays.

Thus, the cable which is the subject of the invention advantageously contains very dense optical modules, for example made from fibers surrounded with a thin film in order to form elementary modules which may range, for example, from two to twelve fibers depending on the intended application. Within one and the same cable, it is possible to mix modules (for example 12) of different capacities. Moreover, such elements are perfectly known and mastered in order to bring together fibers (conventionally of 250 μm diameter) in a minimum space with very simple accessibility given the ease of baring or stripping the thin film. These modules are modules used in cablemaking and therefore belong to known techniques for producing highly compact cables. These elements are thus placed lengthwise in the cavity of the cable which is the subject of the invention. The considerable clearance encountered by these elements along an axis, preferably the short axis, of the cavity makes it possible to achieve very high cabling rates and therefore to produce a cable quickly and very economically. They have a low coefficient of friction which makes it possible to extract them from a row of modules without any difficulty, that is to say without a force detrimental to the behavior or to the strength of the fibers, including over lengths which may reach several meters.

The protective sheath of the cable according to the invention and its cavity have dimensions suitable for the use envisioned. By way of example, the dimensions of the sheath may be from 10 to 15 mm for the long axis and from 6 to 8 mm for the short axis (for an ovalized sheath). By way of example also, the dimensions of the cavity may be from to 5 to 9 mm for the long axis and from 2 to 4 mm for the short axis. The optical elements or modules positioned in the cavity may have a diameter or a longer dimension in section of about 0.8 mm to 1.3 mm.

The optical elements therefore have a certain degree of freedom within the cavity, making it possible to remove stresses on these elementary modules, whether this is after an extension of the sheath under a certain tension or under the effect of an expansion, or after a contraction due to low temperatures.

For this, the cablemaking process, well known moreover in the field of cablemaking, provides, when making the protective sheath and inserting fibers, an initial overlength which is small but sufficient for there to be no actual stresses when the cable is under tension or expanding.

This high degree of freedom along one axis of the cavity allows the optical modules (or fibers) to spread out flat along the other axis of the cavity, and offers, as specified above, two considerable advantages. On the one hand, the possibility of lengthwise cabling of the modules, leading to a very simple process, allows high and very economical production rates. On the other hand, the "sheet" of modules (or fibers) is easily accessible both because of the visibility of the modules and because of the considerable clearance of these same modules in the cavity making them extremely easy to extract including over great lengths. The branching-off of a module (or of a fiber) is carried out without stresses that could damage the module itself (or the fiber), and without an interaction that could damage the nearby modules (or fibers), which is essential for high datarate links and for interventions which may take place while some fibers or some modules are already in service.

The material used for making the sheath is preferably inexpensive, and makes it possible to obtain small radii of curvature, smaller radii of curvature being made possible the greater the lateral clearance of the modules in the cavity, and effective protection of the cable especially against shocks and crushing.

A suitable material may be chosen among elastomers of the natural rubber type, styrene/butylene/styrene and styrene/ethylene-butylene/styrene copolymers, flexible formulations from the elastomeric range, composed of polymers such as ethylene/methyl acrylate, ethylene/ethyl acrylate and ethylene/butyl acrylate copolymers, and ethylene/vinyl acetate copolymers, these polymers possibly being combined with flame-retardant fillers and antioxidant additives; copolymers of the polyesterether type such as the ARNITEL® copolymer manufactured by DSM or the HYTREL® copolymer manufactured by DuPont de Nemours. Preferably, it will be one or more halogen-free flame-retarded polyolefins, of the type commonly used in sheathing cables placed in a building. For external use, it is possible to envision producing a cable with a cavity accommodating the modules, surrounded with a sheath made, for example, of PVC, coated with a medium or high density polyethylene-type jacket more suited to pulling techniques in a conduit and comprising reinforcing members.

In one embodiment, the sheath may have one or more colored threads, obtained for example by coextrusion. The role of these threads is to indicate the regions where the windows can be drilled and, also, to identify the optical cable while giving it an attractive appearance. The windows may be opened on either side of the sheet of fibers or modules. The presence of these colored threads thereby facilitates the opening by the installer.

In another embodiment, the sheath may have one or more fracture initiators marked to a greater or lesser a degree and possibly colored, for example in the hollow of the initiator, possibly in combination with one or more colored threads. Such initiators further facilitate the opening of the windows. However, they tend to embrittle the structure of the cable. An embodiment of this sort is therefore better suited to cables subject to few stresses, for example in the case of buildings with cables laid on a cable tray.

In another embodiment, the sheath has a region of lower thickness, between two guides, so as to facilitate the opening of windows at this lower thickness region.

In the case of cables subject to considerable stresses, for example those placed by pulling, blowing or pushing in a conduit and on an external site, it will be preferred to use a cable comprising, in addition to the usual sheath, an additional external jacket.

In this case, the external jacket may comprise one or more colored threads, and/or one or more fracture initiators, and/or one region of lower thickness. This jacket may also contain reinforcing members. The material of this jacket may be of the medium- or high-density polyethylene type. The sheath and the jacket may be manufactured by coextrusion or, more easily, by successive extrusion of the sheath, for example made of PVC, then of the jacket.

When installing a cable according to the invention, it is therefore seen that it is possible to access, in a continuous manner, that is to say at any point on the cable and at any time, in an extremely simple manner, the optical modules or elements present in the cable.

For example, it is possible to open part of the cable along the long axis over a very short length, and to remove part of the sheath using a tool specially adapted to the shape and to the dimensions of the cable, thereby producing in this way a first window for access to the location intended for the branching-off. Because of its shape, the cable acts as a guide for the tool, which may comprise for example one or two cutting blades. The opening is without risk for the modules or the fibers because of their clearance in the cavity. It is possible to repeat the operation downstream, at a distance from the first window chosen according to the desired branching length, a length which may range, for example, from a few tens of centimeters to several meters, and thus to form a second access window. This is then enough to access the module chosen in the second window, to cut it, then to extract it through the first window, that is to say the window chosen for the branching.

An extraction of this sort is made possible and easy by virtue of the clearance of the modules or of the fibers in the cavity, by virtue of the low coefficient of friction of the material forming their sheath or film, and finally by virtue of the fact that the modules or fibers are laid lengthwise therefore without cabling. Moreover, the windows may be opened only over short lengths, typically a few centimeters.

After the branching, it is possible to close the windows again by attaching (for example by adhesive bonding) a lid which acts as a patch and makes it possible to establish better protection of the modules or fibers inside the cable, a cable which has retained its mechanical properties throughout the branching operation. Moreover, it is possible to place the branched-off fiber or module inside a corrugated sheath of suitable dimensions or any type of prerouted sheath depending on the envisioned use, without having to use intermediate splicings.

Of course, in certain applications, it is possible to envision cables of smaller dimensions with less fiber capacity, by placing possibly colored optical fibers directly in the cavity rather than modules. If modules are used, it is seen that there are many possibilities depending on the aims of the cabling project, each elementary module possibly comprising 2, 4, 6, 8 or 12 fibers for example, offering cable capacities ranging for example from 24 to 96 fibers or even more, depending on the number of modules.

According to the chosen technique, it will be preferred to work with low-capacity modules in order to serve only a single office for example, or it will be preferred to work with higher capacity modules so as to serve a dense region consisting of four, eight or twelve offices or one office containing several workstations.

It is therefore seen that the cable which is the subject of the invention may meet the needs of many engineering choices while retaining its intrinsic qualities of continuous accessibility and of considerable saving on the installation costs.

Of course, this principle of a cable with continuous accessibility is based on the fact that the cost of optical fibers has substantially decreased in the light of decisive productivity steps in modern production processes, and that the technique of continuous branching assumes, except when assuming looping of the links, that the parts of the fibers downstream of the branch are lost for the use in question. On the other hand, it is possible to use these fibers subsequently either to loop a link or to create intermediate links. The fact of losing lengths of fibers proves in any case to be markedly more economical, particularly when using monomode fibers, than laying series of short cables and producing a structure of the distributed type.

The fast and substantial increase of datarates for multimedia-type applications moreover strongly favors the direct use of monomode fibers, including in the vertical and horizontal parts of business cabling, provided that very bottom of the range and very low cost optoelectronic modules are attached for such use. The cable which is the subject of the invention therefore opens a new way of cabling a building or of cabling small town networks, loops etc., which is very economical and very flexible to use, making it possible to envision competitive optical solutions with respect to the successive solutions using copper media, while offering the user a medium capable of accepting considerable datarates.

Other characteristics and advantages of the invention will appear further on reading the description which follows of one particular nonlimiting embodiment, in relation with the figures in which:

FIG. 1 is a sectional view of a cable according to the invention, comprising 12 cable modules of 8 fibers (the fibers are shown only in one of the modules), FIG. 2 is a sectional view of a cable according to the invention (modules not shown), the external sheath of which comprises initiators, FIG. 3 is a sectional view of a cable according to the invention comprising a double sheath (only one module shown), FIG. 4 is a sectional view of the cable of FIG. 1 (only one module shown) after having opened an access window, FIG. 5 is a sectional view of a cable according to the invention (modules not shown), the sheath of which has a lower thickness region, FIG. 6 is a perspective view of a cable according to the invention having two windows for access to the modules, FIG. 7 is a perspective view of the cable of FIG. 6 after closing the downstream window and putting in place a sleeve protecting the branched module.

FIG. 1 shows a sectional view of a cable (1) according to the invention. This cable comprises 12 modules (2) of 8 monomode or multimode optical fibers (3), with a diameter of 250 μm, and coated with a thin film (4) which can be stripped easily. The dimension of the modules may range from 0.8 to 1.3 mm for 12 fibers. The modules (2) are substantially spread out in a sheet over the long axis xx' of the inner cavity (5) of a sheath (6), some modules overlapping. The sheath (6) is of general ovalized external shape. It comprises reinforcing members (7) of the nonmetallic glass-epoxy type located on each side of the short axis. The cavity (5) is of a general ovalized shape with a long axis coincident with the long axis xx' of the oval external shape. The modules are placed so as to retain some clearance along the short axis yy' of the cavity. The sheath comprises colored threads (8a, 8b) on each side of the short axis.

FIG. 6 shows a perspective view of a cable (1) according to the invention, comprising a cavity containing modules (2) surrounded with a sheath comprising reinforcing members (7) and colored threads (8a, 8b), in which two access windows (12, 13) have been opened. A module (2) may be cut in the downstream window (13) before being extracted in the upstream window (12).

FIG. 7 is a perspective view of the cable of FIG. 5, in which the downstream window (13) has been closed by adhesively bonding a lid (14), and the branched-off module (2) has been placed in a corrugated sheath (15).

Figure 1:
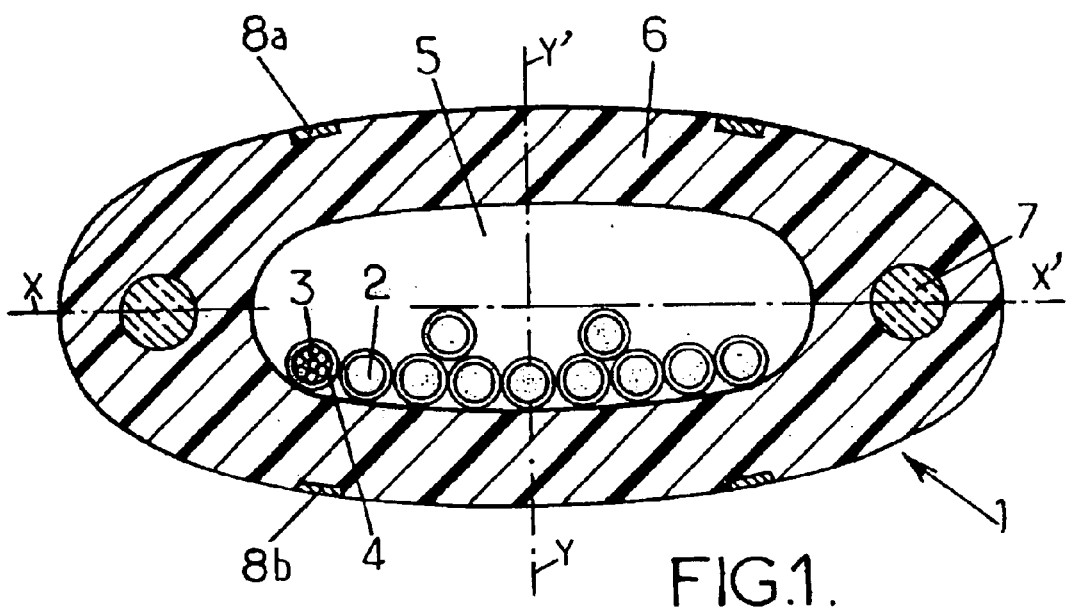
Figure 2:
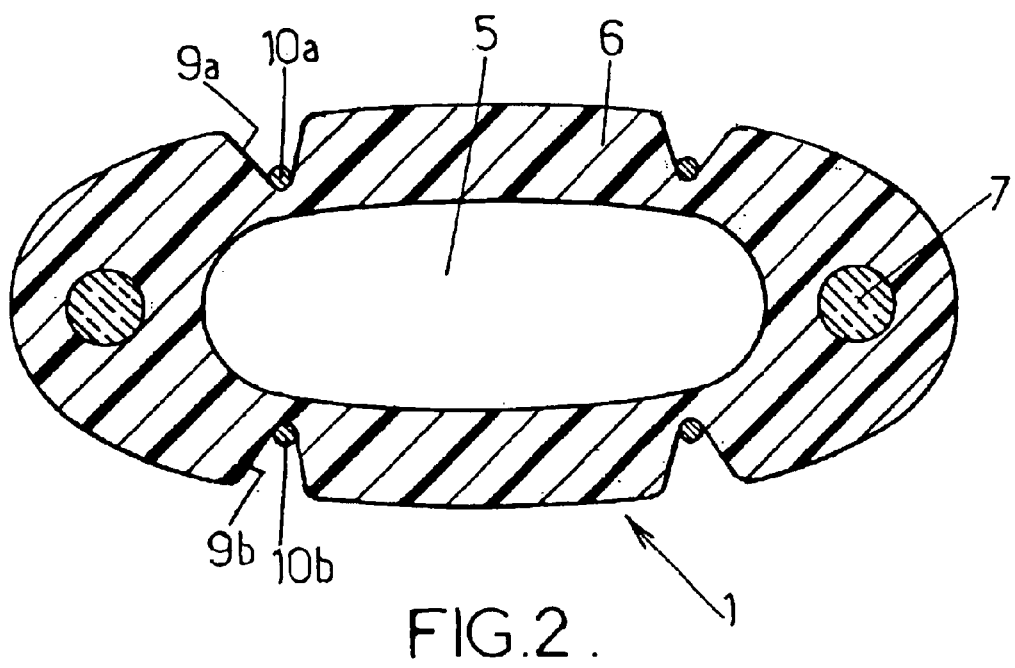
FIG. 2 shows a section of a cable (1) according to the invention. In this embodiment, the sheath (6) forming an internal cavity (5) comprises reinforcing members (7), and fracture initiators (9a, 9b) colored at the base of the hollows (10a, 10b).
Figure 3:
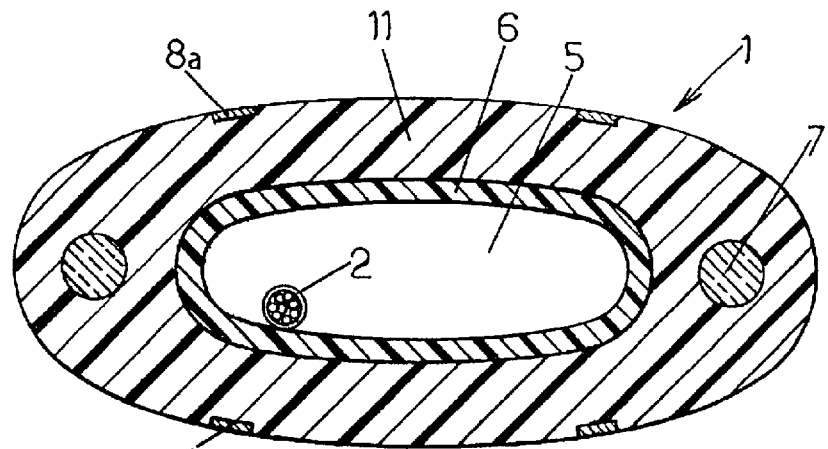
FIG. 3 is a sectional view of a cable (1) according to the invention comprising an internal cavity (5) in which only one module (2) is shown, a sheath (6) made of PVC, and a protective jacket (11) of the medium- or high-density polyethylene type comprising reinforcing members (7) and colored threads (8a, 8b).
Figure 4:
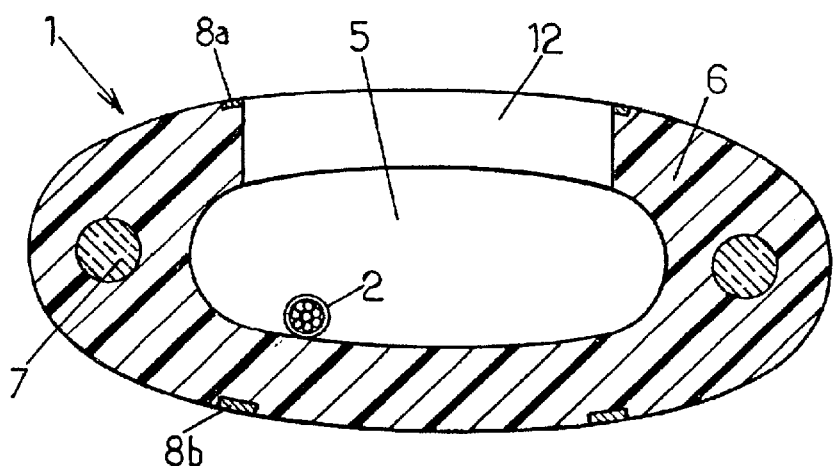
FIG. 4 is a sectional view of the cable (1) of FIG. 1 after a window (12) for accessing the modules (2) has been opened in line with the colored threads (8a).
Figure 5:
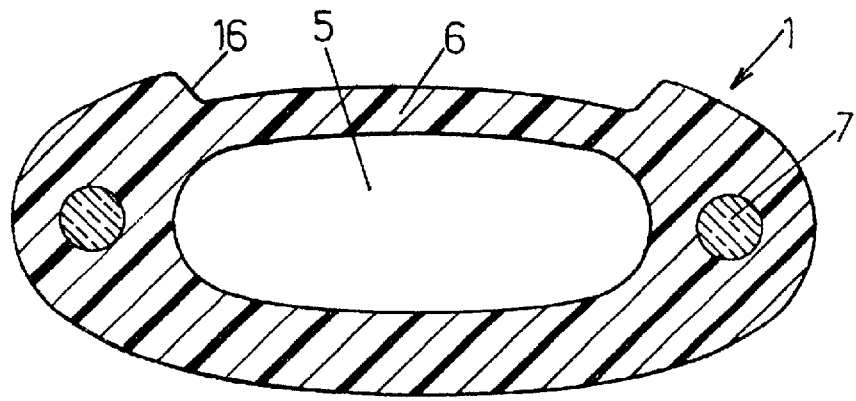
FIG. 5 shows a sectional view of a cable (1), the sheath (6) of which has a region of lower thickness, between two guides (16). The sheath forms an internal cavity (5) and comprises reinforcing members (7).

It is therefore seen that the optical cable with continuous accessibility, which is the subject of the invention, because of its preferably oval general shape, because of its two favored axes one of which is for easy curvature and accessibility to the modules spread out lengthwise in the long dimension of its central orifice and the other of which is for a considerable clearance of the modules which also facilitates extraction and provides the cable with good thermal and mechanical qualities, offers considerable advantages which lead to very economical cabling approaches of a centralized type either for the cable of buildings, or for small external networks or optical loops.

What is claimed is:

1. An optical cable having optical fibers which can be accessed anywhere along the cable, comprising:

a closed protective sheath surrounding a cavity having in cross section two substantially perpendicular axes intersecting at the center of the cavity, each axis defining a width of the cavity, one width being wider than the other shorter width; and at least two optical fibers positioned lengthwise in the cable and arranged such that they occupy the greater part of the cavity in the direction of the wide width but that they allow a clearance in the cavity in the direction of the shorter width of the cavity.

2. The cable as claimed in claim 1, wherein the fibers are organized in at least two optical modules each one comprising at least one fiber surrounded by a thin film.

3. The cable as claimed in claim 1, wherein the cavity has a shape selected in the group consisting of circular, oval and ovalized shapes.

4. The cable as claimed in claim 3, wherein the cavity has an ovalized shape.

5. The cable as claimed in claim 1, wherein the sheath has a shape selected in the group consisting of circular, oval and ovalized shapes.

6. The cable as claimed in claim 5, wherein the sheath has an ovalized shape.

7. The cable as claimed in claim 5, wherein a wide width of the sheath coincides with the wide width of the cavity.

8. The cable as claimed in claim 1, comprising further a jacket around the sheath.

9. The cable as claimed in claim 1, wherein the sheath has at least one colored thread.

10. The cable as claimed in claim 1, wherein the sheath has at least one initiator.

11. The cable as claimed in claim 10, wherein at least one initiator is colored.

12. The cable as claimed in claim 1, wherein the sheath has a region of lower thickness.

13. The cable as claimed in claim 8, wherein the jacket has at least one colored thread.

14. The cable as claimed in claim 8, wherein the jacket has at least one initiator.

15. The cable as claimed in claim 14, wherein at least one initiator is colored.

16. The cable as claimed in claim 8, wherein the jacket has a region of lower thickness.

* * * * *